United States Patent
Shetty et al.

(10) Patent No.: US 6,954,744 B2
(45) Date of Patent: Oct. 11, 2005

(54) COMBINATORIAL APPROACH FOR SUPERVISED NEURAL NETWORK LEARNING

(75) Inventors: Ravindra K. Shetty, Bangalore (IN); Venkatesan Thyagarajan, Bangalore (IN)

(73) Assignee: Honeywell International, Inc., Morristown, NJ (US)

(*) Notice: Subject to any disclaimer, the term of this patent is extended or adjusted under 35 U.S.C. 154(b) by 636 days.

(21) Appl. No.: 09/942,155

(22) Filed: Aug. 29, 2001

(65) Prior Publication Data

US 2003/0055796 A1 Mar. 20, 2003

(51) Int. Cl.[7] ............................ G06F 15/18; G06F 3/00; G06E 1/00
(52) U.S. Cl. .................................. 706/15; 706/16
(58) Field of Search .......................... 706/16

(56) References Cited

U.S. PATENT DOCUMENTS

| | | | |
|---|---|---|---|
| 5,303,330 A | | 4/1994 | Gersho et al. ............. 395/24 |
| 5,793,888 A | * | 8/1998 | Delanoy .................. 382/219 |
| 5,809,490 A | * | 9/1998 | Guiver et al. ............. 706/16 |
| 5,812,992 A | | 9/1998 | de Vries ................. 706/25 |
| 5,940,815 A | | 8/1999 | Maeda et al. ............. 706/12 |
| 5,970,482 A | | 10/1999 | Pham et al. .............. 706/16 |
| 6,421,612 B1 | * | 7/2002 | Agrafiotis et al. ......... 702/19 |
| 6,424,961 B1 | * | 7/2002 | Ayala ................... 706/25 |

FOREIGN PATENT DOCUMENTS

| | | | | |
|---|---|---|---|---|
| EP | 528399 A2 | 2/1993 | | G06F/15/80 |

* cited by examiner

Primary Examiner—Anthony Knight
Assistant Examiner—Michael B. Holmes
(74) Attorney, Agent, or Firm—Schwegman, Lundberg, Woessner & Kluth, P.A.

(57) ABSTRACT

A technique for machine learning, such as supervised artificial neural network learning includes receiving data and checking the dimensionality of the read data and reducing the dimensionality to enhance machine learning performance using Principal Component Analysis methodology. The technique further includes specifying the neural network architecture and initializing weights to establish a connection between read data including the reduced dimensionality and the predicted values. The technique also includes performing supervised machine learning using the specified neural network architecture, initialized weights, and the read data including the reduced dimensionality to predict values. Predicted values are then compared to a normalized system error threshold value and the initialized weights are revised based on the outcome of the comparison to generate a learnt neural network having a reduced error in weight space. The learnt neural network is validated using known values and is then used for predicting values.

72 Claims, 3 Drawing Sheets

US 6,954,744 B2

COMBINATORIAL APPROACH FOR SUPERVISED NEURAL NETWORK LEARNING

FIELD OF THE INVENTION

This invention relates generally to the field of intelligent information retrieval, and more particularly pertains to intelligent information retrieval based on machine learning.

BACKGROUND

The future of intelligent information retrieval seems to be based on machine learning techniques such as Artificial Neural Network (ANN or NN). ANN's ability to express non-linear relationships in data results in better classification and is best suited for information retrieval applications such as pattern recognition, prediction, and classification.

The ANN technique attempts to emulate the architecture and information representation schemes of the human brain. Its architecture depends on the goal to be achieved. The learning in ANN can be either supervised or unsupervised. In supervised learning (SL) ANN assumes what the result should be (like a teacher instructing a pupil). In this case we present the input, check what the output shows and then adjust the connection strengths (weights) between the input and output mapping until the correct output is given. This can be applied to all inputs until the network becomes as error free as possible. The SL method requires an output class declaration for each of the inputs.

Present SL methods can handle either offline (static) or online (dynamic/time series) data but not both. Also, current SL methods take a long time for learning, and require a significantly greater number of iterations to stabilize. The present SL methods use the Conjugate Generalized Delta Rule (Conjugate GDR) for machine learning when using static data and are not guaranteed to find a global optimum. The GDR based on stochastic approximation used for time series data is complex and unreliable because GDR can only handle offline data.

Therefore, there is a need in the art for a SL technique that can handle both static and time series data. Further, there is also a need in the art for a SL technique that can reduce the dimensionality of the received data to enhance machine learning rate and system performance.

SUMMARY OF THE INVENTION

One aspect of the present invention is a method for machine learning, such as supervised artificial neural network learning. The method is performed by receiving data and checking the dimensionality of the received data and reducing the dimensionality to enhance machine learning performance using a Principal Component Analysis (PCA) methodology. The method further includes specifying the neural network architecture and initializing weights to establish connection between read data including the reduced dimensionality and the predicted values. The method also includes performing supervised machine learning using the specified neural network architecture, initialized weights, and the read data including the reduced dimensionality to predict values. Predicted values are then compared to a normalized system error threshold value and the initialized weights are revised based on the outcome of the comparison to generate a learnt neural network having a reduced error in weight space. The learnt neural network is validated using known values and then used for predicting values.

Another aspect of the present invention is a computer readable medium having computer-executable instructions for performing a method of supervised artificial neural network learning. According to the method, the dimensionality of the received data is checked and reduced to enhance machine learning performance using a PCA methodology. The method further includes specifying the neural network architecture and initializing weights to establish connection between read data including the reduced dimensionality and the predicted values. The method also includes performing supervised machine learning using the specified neural network architecture, initialized weights, and the read data including the reduced dimensionality to predict values. Predicted values is then compared to a normalized system error threshold value and the initialized weights are revised based on the outcome of the comparison to generate a learnt neural network having a reduced error in weight space. The learnt neural network is validated using known values and then used for predicting values.

Another aspect of the present invention is a computer system for supervised artificial neural network learning. The computer system comprises a storage device, an output device and a processor programmed for repeatedly performing a method. According to the method, the dimensionality of the received data is checked and reduced to enhance machine learning performance using a PCA methodology. The method further includes specifying the neural network architecture and initializing weights to establish connection between read data including the reduced dimensionality and the predicted values. The method also includes performing supervised machine learning using the specified neural network architecture, initialized weights, and the read data including the reduced dimensionality to predict values. Predicted values are then compared to a normalized system error threshold value and the initialized weights are revised based on the outcome of the comparison to generate a learnt neural network having a reduced error in weight space. The learnt neural network is validated using known values and then used for predicting values.

Another aspect of the present invention is a computer-implemented system for supervised artificial neural network learning. The computer system comprises a receive module to receive data. A reading module reads the received data. An analyzer checks the dimensionality of the read data and reduces the dimensionality of the received data to enhance machine learning performance based on the outcome of the checking. The analyzer further specifies neural network architecture and initializes weights to establish connection strengths between the received data and the predicted values obtained using the neural network. The analyzer then performs the supervised learning using the specified architecture, initialized weights, and the received data including the reduced dimensionality to predict the values. A comparator compares the predicted values to a normalized system error threshold value. The analyzer then revises the initialized weights of the neural network based on the outcome of the comparison to generate a learnt neural network having reduced error in the weight space.

Other aspects of the invention will be apparent on reading the following detailed description of the invention and viewing the drawings that form a part thereof.

DETAILED DESCRIPTION

Supervised machine learning is performed in both static and real-time data environments.

Figure 1:
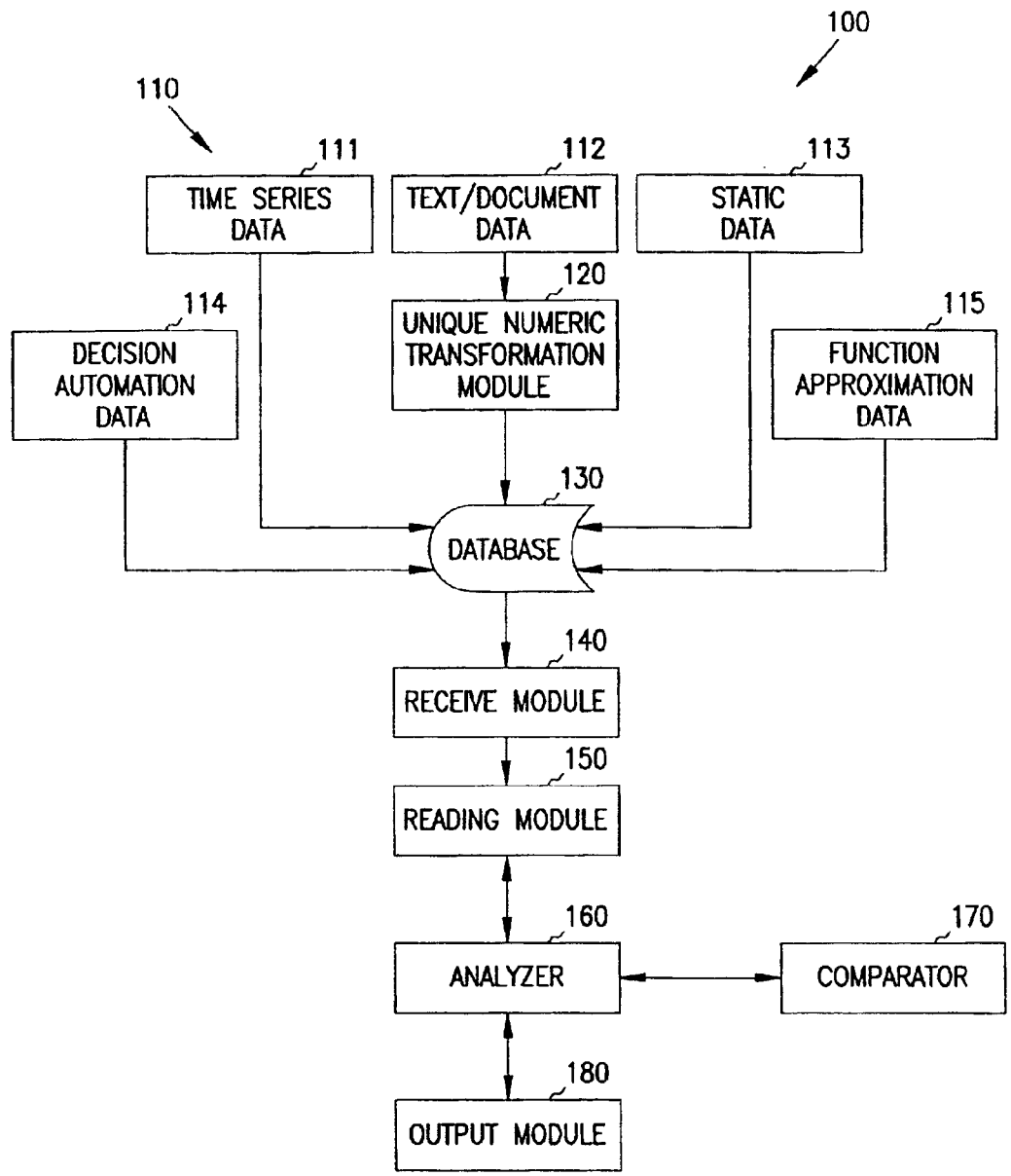
FIG. 1 is a block diagram of one embodiment of major components of the computer-implemented system according to the teachings of the present invention.

FIG. 1 illustrates an overview of one embodiment of a computer-implemented system 100 according to the present invention. A database 130 is connected to receive various types of received data indicated generally at 110. For example, the database 130 can receive data such as time series data 111, text/document data 112, static unstructured data 113, decision automation data 114, and/or function approximation data 115. Decision automation data means data encapsulating human judgment and domain expertise in software systems, which is necessary for computers to support human decision-making activities. For example, such data is already used in today's automobiles to embody control systems that make expert breaking decisions based on encapsulated judgment of complex conditions in real time. Function approximation means a curve-fitting method used to find close association between the actual and computed dependant variables to obtain a set of independent variables. In some embodiments, a unique numeric representation module 120 is coupled to receive text/document data 110 and transform the received text/document data into a unique numeric representation.

A receive module 140 is connected to database 130 to receive the data from the database 130. A reading module 150 is connected to the receive module 140 to read a sample of the received data from the receive module 140. In some embodiments, the reading module reads the sample of the received data such that the sample of read data has a predetermined window length. If the receive module 140 receives static data, then the reading module 150 reads a sample of the received static data using a static window of predetermined length. If the receive module 140 receives real-time data, then the reading module 150 reads a sample of the received real-time data using a dynamically varying window of predetermined length.

An analyzer 160 coupled to the reading module 150 checks dimensionality of the read data and reduces the dimensionality of the read data to enhance machine learning performance based on the outcome of the checking. In some embodiments, a comparator 170 coupled to the analyzer 160 compares the dimensionality of the read data to a threshold value, and the analyzer 160 reduces the dimensionality of the read data to increase machine learning performance based on the outcome of the comparison by the comparator 170. In some embodiments, the threshold value is greater than or equal to 25. In some embodiments, the comparator 170 compares the number of attributes in the read data to the threshold value, and the analyzer 160 reduces the dimensionality of the read data by reducing the number of attributes in the read data using Principal Component Analysis (PCA).

In some embodiments, the analyzer 160 reduces the dimensionality of the read data by forming a Covariance Matrix using the equation:

$$C_{n \times n} = X^t * X$$

wherein the received data is inputted in matrix form (say $X_{m \times n}$). The analyzer 160 then computes eigen values and eigen vectors from the formed Covarian Matrix using the equation:

$$(C - \lambda I)U_i = 0 \rightarrow \quad (1)$$

wherein $\lambda = (\lambda_1, \lambda_2, \ldots, \lambda_n)$ are the roots of the equation. Solving the equation (1) gives eigen values, and $U_i = (u_{i1}, u_{i2}, \ldots, u_{in})$ gives the corresponding eigen vectors. The analyzer 160 then selects the principal components using the equation:

$$\left\{ 1, 2, \ldots k \;\middle|\; \sum_{i=1}^{k} \lambda_i \Big/ \sum_{i=1}^{n} \lambda_i \geq \beta \right\}$$

wherein $\beta$ is the cutoff percentage (~85%). The analyzer 160 further selects features in the received data using the equation:

$$\left\{ j \;\middle|\; U_{ij} \geq \max_j \{U_{ij}\}/2,\; i \in \text{cuttoff}(k) \right\}$$

to reduce the dimensionality of the received data.

The analyzer 160 then specifies neural network architecture and initializes weights to establish connection strengths between the read data and the values predicted by the neural network. Using the specified architecture, initialized weights, and the read data the analyzer 160 performs supervised learning to predict values. In some embodiments, the analyzer 160 specifies the learning parameters using learning parameters such as number of input nodes, number of hidden layers, number of nodes in each of the layers, number of nodes at the output layer, learning rate, and/or dynamic storage for updating the initial weights. In some embodiments, the analyzer 160 initializes the weights using random values ranging from about −0.5 to 0.5.

The comparator 170 compares the predicted values to a normalized system error threshold value. The analyzer 160 then revises the initialized weights of the neural network based on the outcome of the comparison to generate a learnt neural network having a reduced error in weight space. In some embodiments, the analyzer 160 computes the normalized system error by using desired values and the predicted values. The comparator 170 then compares the computed normalized system error with the normalized system error threshold value to reduce the error in the weight space using a gradient descent technique based on the outcome of the comparison.

In some embodiments, the analyzer 160 reduces the previous iteration error in the weight space by using the equation:

$$W_{ij}(n+1) = W_{ij}(n) + \eta(\delta_j o_i)$$

wherein $W_{ij}$ are the weights in a space of i rows and j columns, $o_i$ is the actual output, $\delta_j$ is the desired output, and $\eta$ is the learning rate.

In some embodiments, the analyzer 160 enhances the learning rate of the neural network while reducing the error (when the computed normalized system error exceeds the normalized system error threshold value) in the previous iteration using a Hessian Matrix. In these embodiments, the analyzer 160 uses the following equation for the Hessian Matrix to enhance learning rate of the neural network:

$$H[i, k] = \sum_k \sum_j G[k] * w[i, j]$$

wherein H[i, k] are diagonal elements of second order derivatives, wherein i,j, and k are an architecture dependent number of nodes and hidden layers, and wherein $$G[k] = \sum_j w[j, k] * d[i, k]$$

wherein G [k] is a gradient of the previous iteration error with respect to the weight space and i,j, and k are an architecture dependent number of nodes and hidden layers.

In some embodiments, the analyzer 160 further enhances the learning rate of the neural network while reducing the error (when the computed normalized system error exceeds the normalized system error threshold value) in the previous iteration using a function approximation neighborhood technique when the computed normalized system error exceeds the normalized system error threshold value. In these embodiments, the analyzer 160 uses the following equation for the function approximation neighborhood technique to update weights:

$$W(t+1) = f(n, m, \delta r(t))$$

wherein n is a number of nodes in the input layer, m is a number of nodes in the next layer, and δr(t) is a parameter based on a function of time.

Using the learnt neural network the analyzer 160 validates the learnt neural network to verify the reliability of the learnt neural network by performing supervised learning to predict the values. Using the predicted values and known and/or expected data the analyzer 160 computes the accuracy of the predicted values. The comparator compares the computed accuracy with an accuracy value. The analyzer 160 then repeats the supervised learning to update weights to further reduce system error based on the outcome of the comparison. Using the validated neural network and unknown input, an output module 180 coupled to the analyzer 170 predicts the values.

Figure 2:
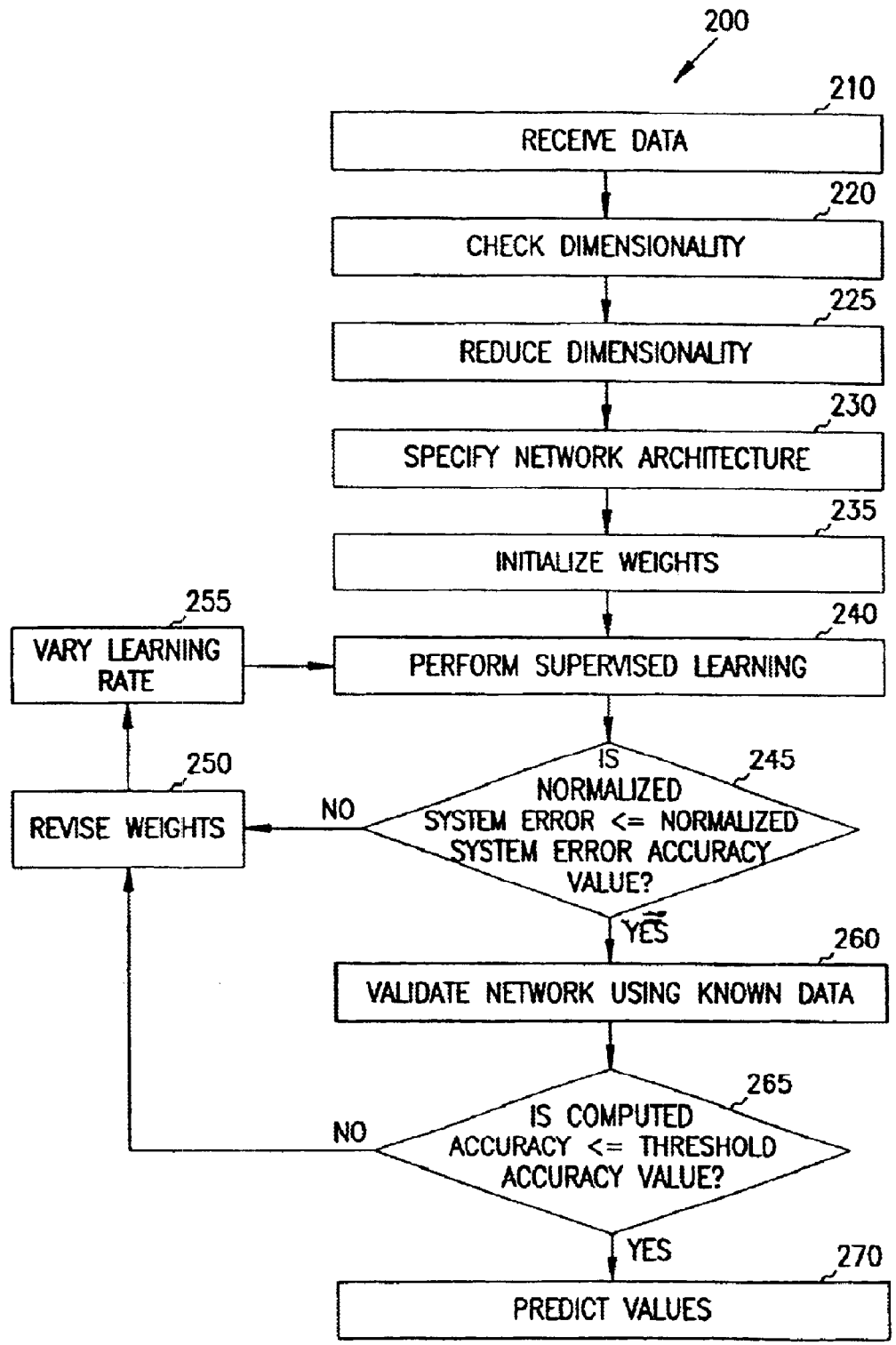
FIG. 2 is a flow chart illustrating the overall operation of the embodiment shown in FIG. 1.

FIG. 2 illustrates an overview of one embodiment of process 200 of the present invention. As shown in FIG. 2, one aspect of the present invention is a computer readable medium having computer-executable instructions for performing the process 200 for supervised machine learning.

The process begins with step 210 by receiving sparse data such as time series data (for example, time series data can include real-time data such as share market data and weather forecast data, engine data, and/or aircraft maintenance data), text document data, and/or static unstructured data. In some embodiments, if the received data is static data, then the process includes receiving the data using a predetermined window length, and if the received data is dynamic data, then the process includes receiving the dynamic data using a dynamically varying window of predetermined window length. In some embodiments, if the received data is real-time data, then the process includes repeating the reading of the sample of the received real-time data using a dynamically varying window of predetermined window length.

Steps 220 and 225 include checking dimensionality of the received data, and reducing the dimensionality of the received data to enhance machine learning performance based on the outcome of the checking, respectively. In some embodiments, this includes comparing the dimensionality of the received data to a threshold value, and reducing the dimensionality of the received data to increase machine learning performance based on the outcome of the comparison. In some embodiments, comparing the dimensionality of the received data includes comparing the number of attributes in the received data to the threshold value, and reducing the number of attributes in the received data using PCA based on the outcome of the comparison. The technique of reducing the number of attributes using the PCA is described in more detail with reference to FIG. 1. In some embodiments, the threshold value is greater than or equal to 25 attributes.

Step 230 includes specifying the supervised neural network architecture. In some embodiments, this includes specifying learning parameters for the neural network such as number of input nodes, number of hidden layers, number of nodes in each of the layers, number of nodes at the output layer, and/or learning rate. This can also include allocating dynamic storage for updating the initialized weights and to store the trend between input and output nodes during each iteration using the specified neural network architecture. Step 235 includes initializing weights to establish connection strengths between the received data and predicted values. In some embodiments, initializing the weights includes initializing the weights using random weights.

Step 240 includes performing supervised machine learning using the specified architecture, initialized weights, and the received data including the reduced dimensionality to predict values. Steps 245 and 250 includes comparing the predicted values to desired values and revising the initialized weights of the neural network based on the outcome of the comparison to generate a learnt neural network having a reduced error in weight space, respectively. In some embodiments, comparing the predicted values to the desired values includes computing the normalized system error by using the desired values and the predicted values to reduce error in the weight space using a gradient descent technique, comparing the computed normalized system error with the normalized system error threshold value. The computing of the normalized system error using the gradient descent technique is discussed in more detail with reference to FIG. 1. In these embodiments, the above described steps of checking, reducing, specifying, performing, and comparing steps until computed normalized system error is less than or equal to the normalized system error threshold value.

In some embodiments, Step 255 includes varying the learning rate of the supervised neural network by using a Hessian matrix to enhance learning of the neural network, and further includes using a function approximation neighborhood technique to perturb the learning parameters of the neural network, to further enhance the learning rate of the neural network. The techniques of enhancing the learning rate of the neural network using the Hessian matrix and the function approximation neighborhood technique is discussed in more detail with reference to FIG. 1.

Step 260 includes validating the learnt neural network to verify the reliability of the learnt neural network. In some embodiments, this includes performing supervised learning using the learnt neural network to predict values, and computing accuracy of the predicted values by comparing the predicted values with known values, then comparing the computed accuracy with an accuracy value and repeating the performing, comparing, and validating steps based on the outcome of the comparison to further enhance the reliability of the learnt neural network. In some embodiments, the above steps are repeated until the computed accuracy is less than or equal to the accuracy value. In some embodiments varying the learning rate step is also repeated to further enhance the learning of the neural network while validating the neural network by comparing the computed accuracy with the accuracy value.

Step 270 includes predicting values by inputting unknown values into the validated neural network and performing supervised learning on the validated neural network.

The method 200 shown in FIG. 2 may be implemented as a receive module 140, a reading module 150, an analyzer 160, and/or a comparator 170, as shown in FIG. 1. Various aspects of the present invention are implemented in software, which may be run in the environment shown in FIG. 2 or any other suitable computing environment. The present invention is operable in a number of other general purpose or special purpose computing environments. Some computing environments are personal computers, general-purpose computers, server computers, hand held devices, laptop devices, multiprocessors, microprocessors, set top boxes, programmable consumer electronics, network PCs, minicomputers, mainframe computers, distributed computing environments, and the like, to execute the code, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 3:
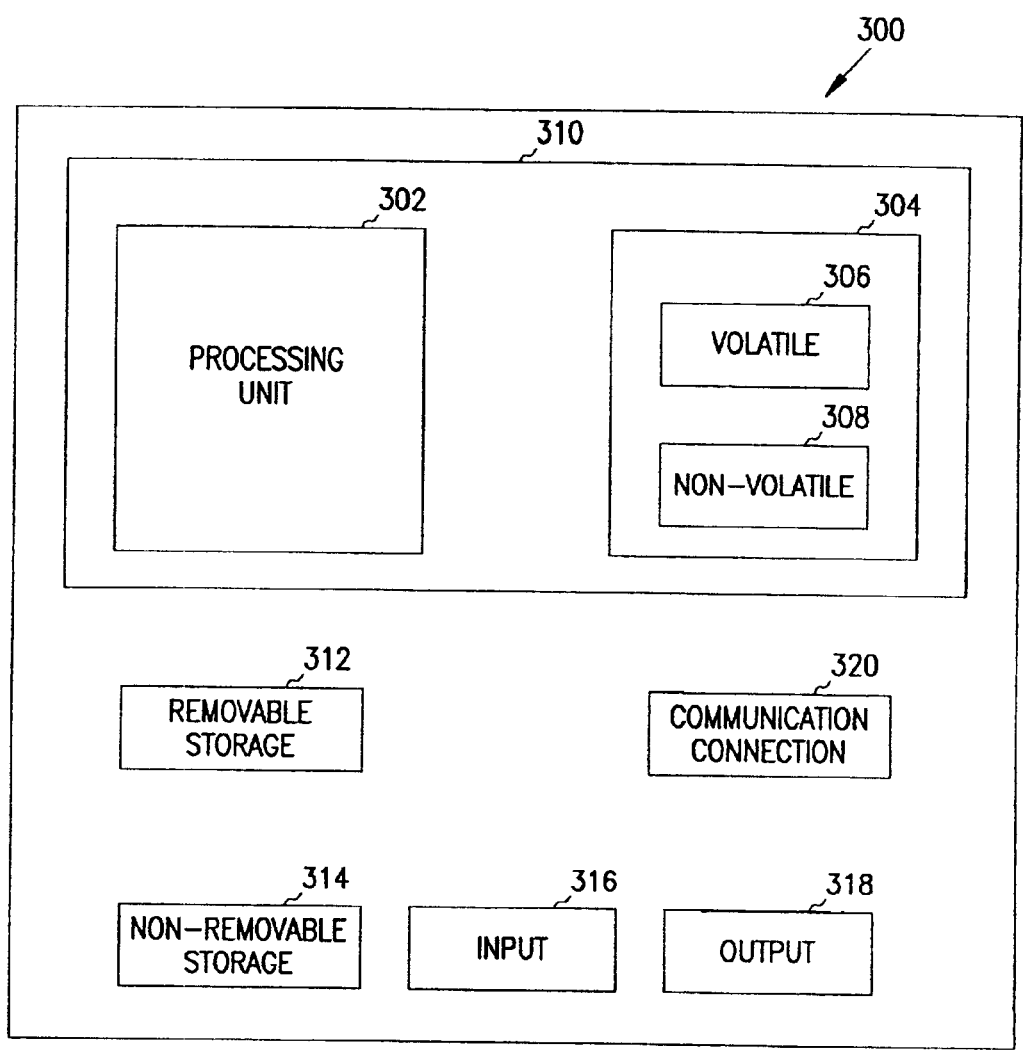
FIG. 3 shows an example of a suitable computing system environment for implementing embodiments of the present invention, such as those shown in FIGS. 1 and 2.

FIG. 3 shows an example of a suitable computing system environment 300 for implementing embodiments of the present invention, such as those shown in FIGS. 1 and 2. Various aspects of the present invention are implemented in software, which may be run in the environment shown in FIG. 3 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or implement particular abstract data types. In a distributed computing environment, program modules may be located in local or remote storage devices.

FIG. 3 shows a general computing device in the form of a computer 310, which may include a processing unit 302, memory 304, removable storage 312, and non-removable storage 314. The memory 304 may include volatile 306 and non-volatile memory 308. Computer 310 may include—or have access to a computing environment that includes—a variety of computer-readable media, such as volatile 306 and non-volatile memory 308, removable 312 and non-removable storage 314. Computer-readable media also includes carrier waves, which are used transmit executable code between different devices by means of any type of network. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

CONCLUSION

The above-described computer-implemented technique provides a technique for supervised artificial neural network learning for both static and time series data. In addition the above-described technique reduces the dimensionality of the received data to enhance machine learning rate and system performance. The above-described technique can be used to predict values in applications such as automated e-mail response, text mining, document classification, information search, prediction of weather, sales forecasting, forecasting stock market data, validation of data, and/or risk management. The above-described technique can also be used for applications such as industrial automation, process controls and other similar applications.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A computer-implemented method for supervised artificial neural network machine learning, comprising:
   reducing the dimensionality of the received data to enhance machine learning performance based on the dimensionality;
   specifying the supervised neural network architecture;
   initializing weights to establish connection strengths between the received data and predicted values;
   performing supervised machine learning using the specified architecture, initialized weights, and the received data including the reduced dimensionality to predict values; and
   revising the initialized weights of the network based on a normalized system error threshold value to generate a learnt neural network having a reduced error in weight space.

2. The method of claim 1, wherein the data comprises:
   data selected from the group consisting of static data and real-time data.

3. The method of claim 2, wherein reducing the dimensionality of the received data to enhance machine learning performance based on the dimensionality, further comprises:
   receiving data;
   checking dimensionality of the received data; and
   reducing the dimensionality of the received data to enhance machine learning performance based on the outcome of the checking.

4. The method of claim 3, wherein checking the dimensionality of the received data to improve performance during the machine learning further comprises:
   comparing the dimensionality of the received data to a threshold value; and reducing the dimensionality of the received data to increase machine learning performance based on the outcome of the comparison.

5. The method of claim 4, wherein reducing the dimensionality of the received data comprises;
reducing the number of attributes in the received data using Principal Component Analysis.

6. The method of claim 4, wherein comparing the dimensionality of the received data to the threshold value comprises:
comparing the number of attributes in the received data to the threshold value.

7. The method of claim 6, wherein the threshold value comprises:
greater than or equal to 25 attributes.

8. The method of claim 2, further comprising:
if the received data is static data, then reading a sample of the received static data using a predetermined window length; and
if the received data is real-time data, then reading a sample of the received real-time data using a dynamically varying window of predetermined window length.

9. The method of claim 8, further comprising:
if the received data is real-time data, then repeating the receiving of the real-time data using a dynamically varying window of predetermined window length.

10. The method of claim 2, wherein specifying the supervised neural network architecture comprises:
specifying the learning parameters for the neural network selected from the group consisting of number of input nodes, number of hidden layers, number of nodes in each of the layers, number of nodes at the output layer, and learning rate; and
allocating dynamic storage for updating the initialized weights and to store the trend between input and output nodes during each iteration using the specified neural network architecture.

11. The method of claim 2, wherein initializing the weights further comprises:
initializing the weights using random weights.

12. The method of claim 2, wherein revising the initialized weights of the network based on a normalized system error threshold value, further comprises:
comparing the predicted values to a normalized system error threshold value; and
revising the initialized weights of the neural network based on the outcome of the comparison to generate a learnt neural network having a reduced error in weight space.

13. The method of claim 12, wherein comparing the predicted values to the normalized system error threshold value further comprises:
computing the normalized system error by using desired values and the predicted values to reduce error in the weight space using a gradient descent technique; and
comparing the computed normalized system error with the normalized system error threshold value.

14. The method of claim 13, further comprising:
repeating the performing and comparing steps until the computed normalized difference error is less than or equal to the normalized system error threshold value.

15. The method of claim 1, further comprising:
using a Hessian matrix to enhance the learning rate of the neural network; and using a function approximation neighborhood technique to perturb the learning parameters of the neural network to further enhance the learning rate of the neural network.

16. The method of claim 1, further comprising:
validating the learnt neural network to verify the reliability of the learnt neural network.

17. The method of claim 16, wherein validating the neural network further comprises:
performing supervised learning using the learnt neural network to predict the values;
computing accuracy of the predicted values by comparing the predicted values with the known values;
comparing the computed accuracy with an accuracy value; and
repeating the varying learning rate, performing, comparing, and validating steps based on the outcome of the comparison to further enhance the reliability of the learnt neural network.

18. The method of claim 16, further comprising:
inputting unknown values into the validated neural network; and
predicting the values by performing supervised learning on the validated neural network.

19. A computer readable medium having computer-executable instructions for supervised artificial neural network learning, comprising:
receiving data;
checking dimensionality of the received data;
reducing the dimensionality of the received data to enhance machine learning performance based on the outcome of the checking;
specifying the supervised neural network architecture;
initializing weights to establish connection strengths between the received data and predicted values;
performing supervised machine learning using the specified architecture, initialized weights, and the received data including the reduced dimensionality to predict values;
comparing the predicted values to a normalized system error threshold value; and
revising the initialized weights of the neural network based on the outcome of the comparison to generate a learnt neural network having reduced error in weight space.

20. The computer readable medium of claim 19, wherein the data comprises:
data selected from the group consisting of static data and real-time data.

21. The computer readable medium of claim 20, wherein checking the dimensionality of the received data to improve performance during the machine learning further comprises:
comparing the dimensionality of the received data to a threshold value; and
reducing the dimensionality of the received data to increase machine learning performance based on the outcome of the comparison.

22. The computer readable medium of claim 21, wherein reducing the dimensionality of the received data comprises;
reducing the number of attributes in the received data using Principal Component Analysis.

23. The computer readable medium of claim 21, wherein comparing the dimensionality of the received data to the threshold value comprises:
comparing the number of attributes in the received data to the threshold value.

24. The computer readable medium of claim 23, wherein the threshold value comprises:

greater than or equal to 25 attributes.

25. The computer readable medium of claim 20, further comprising:

if the received data is static data, then reading a sample of the received static data using a predetermined window length; and if the received data is real-time data, then reading a sample of the received real-time data using a dynamically varying window of predetermined window length.

26. The computer readable medium of claim 25, further comprising:

if the received data is real-time data, then repeating the receiving of the real-time data using a dynamically varying window of predetermined window length.

27. The computer readable medium of claim 20, wherein specifying the supervised neural network architecture comprises:

specifying the learning parameters for the neural network selected from the group consisting of number of input nodes, number of hidden layers, number of nodes in each of the layers, number of nodes at the output layer, and learning rate; and allocating dynamic storage for updating the initialized weights and to store the trend between input and output nodes during each iteration using the specified neural network architecture.

28. The computer readable medium of claim 20, wherein initializing the weights further comprises:

initializing the weights using random weights.

29. The computer readable medium of claim 20, wherein comparing the predicted values to the normalized system error threshold value further comprises:

computing the normalized system error by using desired values and the predicted values to reduce error in the weight space using gradient descent technique; and comparing the computed normalized system error with the normalized system error threshold value.

30. The computer readable medium of claim 29, further comprising:

repeating the performing and comparing steps until the computed normalized difference error is less than or equal to the normalized system error threshold value.

31. The computer readable medium of claim 19, further comprising:

using a Hessian matrix to enhance learning rate of the neural network; and using a function approximation neighborhood technique to perturb the learning parameters of the neural network to further enhance the learning rate of the neural network.

32. The computer readable medium of claim 19, further comprising:

validating the learnt neural network to verify the reliability of the learnt neural network.

33. The computer readable medium of claim 32, wherein validating the neural network further comprises:

performing supervised learning using the learnt neural network to predict the values;

computing accuracy of the predicted values by comparing the predicted values with the known values;

comparing the computed accuracy with an accuracy value; and repeating the varying learning rate, performing, and comparing steps based on the outcome of the comparison.

34. The computer readable medium of claim 32, further comprising:

using the validated neural network for predicting the values.

35. A computer system for machine learning in a sparse data environment, comprising:

a storage device;

an output device; and a processor programmed to repeatedly perform a method, comprising:

receiving the data;

checking dimensionality of the received data;

reducing the dimensionality of the received data to enhance machine learning performance based on the outcome of the checking;

specifying the supervised neural network architecture;

initializing weights to establish connection strengths between the received data and predicted values;

performing supervised machine learning using the specified architecture, initialized weights, and the received data including the reduced dimensionality to predict the values;

comparing the predicted values to a normalized system error threshold value; and revising the initialized weights of the neural network based on the outcome of the comparison to generate a learnt neural network having reduced error in weight space.

36. The system of claim 35, wherein the data comprises:

data selected from the group consisting of static data and real-time data.

37. The system of claim 36, wherein checking the dimensionality of the received data to improve performance during the machine learning further comprises:

comparing the dimensionality of the received data to a threshold value; and reducing the dimensionality of the received data to increase machine learning performance based on the outcome of the comparison.

38. The system of claim 37, wherein reducing the dimensionality of the received data comprises:

reducing number of attributes in the received data using Principal Component Analysis.

39. The system of claim 37, wherein comparing the dimensionality of the received data to the threshold value comprises:

comparing the number of attributes in the received data to the threshold value.

40. The system of claim 39, wherein the threshold value comprises:

greater than or equal to 25 attributes.

41. The system of claim 36, further comprising:

if the received data is static data, then reading a sample of the received static data using a predetermined window length; and if the received data is real-time data, then reading a sample of the received real-time data using a dynamically varying window of predetermined window length.

42. The system of claim 41, further comprising:

if the received data is real-time data, then repeating the receiving of the real-time data using a dynamically varying window of predetermined window length.

43. The system of claim 36, wherein specifying the supervised neural network architecture comprises:

specifying the learning parameters for the neural network selected from the group consisting of number of input nodes, number of hidden layers, number of nodes in each of the layers, number of nodes at the output layer, and learning rate; and allocating dynamic storage for updating the initialized weights and to store the trend between input and output nodes during each iteration using the specified neural network architecture.

44. The system of claim 36, wherein initializing the weights further comprises:

initializing the weights using random weights.

45. The system of claim 36, wherein comparing the predicted values to the normalized system error threshold value further comprises:

computing the normalized system error by using desired values and the predicted values to reduce error in the weight space using gradient descent technique; and comparing the computed normalized system error with the normalized system error threshold value.

46. The system of claim 45, further comprising:

repeating the performing and comparing steps until the computed normalized difference error is less than or equal to the normalized system error threshold value.

47. The system of claim 35, further comprising:

using a Hessian matrix to enhance learning rate of the neural network; and using a function approximation neighborhood technique to perturb the learning parameters of the neural network to further enhance the learning rate of the neural network.

48. The system of claim 35, further comprising:

validating the learnt neural network to verify the reliability of the learnt neural network.

49. The system of claim 48, wherein validating the neural network further comprises:

performing supervised learning using the learnt neural network to predict values;

computing accuracy of the predicted values by comparing the predicted values with the known values;

comparing the computed accuracy with an accuracy value; and repeating the performing and comparing steps based on the outcome of the comparison.

50. The system of claim 48, further comprising:

using the validated neural network for predicting the values.

51. A computer-implemented system for supervised artificial neural network learning, comprising:

a receive module to receive data;

a reading module to read the received data;

an analyzer to check dimensionality of the read data and reduce the dimensionality of the read data to enhance machine learning performance based on the outcome of the checking;

wherein the analyzer specifies neural network architecture and initializes weights to establish connection strengths between the read data and predicted values obtained using the neural network, wherein the analyzer performs supervised learning using the specified architecture, initialized weights, and the read data including the reduced dimensionality to predict the values; and a comparator coupled to the analyzer, compares the predicted values to a normalized system error threshold value, wherein the analyzer revises the initialized weights of the neural network based on the outcome of the comparison to generate a learnt neural network having a reduced error in weight space.

52. The system of claim 51, further comprising:

a database coupled to the receive module to receive and store data.

53. The system of claim 52, wherein the data comprises:

data selected from the group consisting of static data and real-time data.

54. The system of claim 53, wherein the comparator compares the dimensionality of the read data to a threshold value, and the analyzer reduces the dimensionality of the read data to increase neural network learning performance based on the outcome of the comparison by the comparator.

55. The system of claim 54, wherein the threshold value is greater than or equal to 25.

56. The system of claim 55, wherein the comparator compares number of attributes in the read data to the threshold value.

57. The system of claim 54, wherein the analyzer reduces the dimensionality of the read data by reducing the number of attributes in the read data using Principal Component Analysis.

58. The system of claim 57, wherein the analyzer reduces the dimensionality of the read data by forming a Covariance Matrix using the equation:

$$C_{n \times n} = X^T * X$$

wherein the received data is inputted in a matrix form (say $X_{m \times n}$);

and eigen values and eigen vectors are computed from the formed Covariance Matrix using the equation:

$$(C - \lambda I) U_i = 0 \rightarrow \qquad (1)$$

wherein $\lambda = (\lambda_1, \lambda_2, \ldots, \lambda_n)$ are the roots of the equation, solving the equation (1) gives eigen values, and $U_i = (u_{i1}, u_{i2}, \ldots, u_{in})$ gives the corresponding eigen vectors;

and principal components are selected using the equation:

$$\left\{ 1, 2, \ldots k \,\middle|\, \sum_{i=1}^{k} \lambda_i \,\bigg/\, \sum_{i=1}^{n} \lambda_i \geq \beta \right\}$$

where $\beta$ is the cutoff percentage (~85%);

and features are further selected using the equation:

$$\left\{ j \,\middle|\, U_{ij} \geq \max_{j}\{U_{ij}\}/2,\, i \in \text{cuttoff } (k) \right\}$$

to reduce the dimensionality of the received data.

59. The system of claim 54, wherein the reading module reads a sample of the received data using a predetermined window length.

60. The system of claim 59, wherein the reading module reads the sample of the received data using a predetermined window length when the read data is static data, and the reading module reads a sample of the received data using a dynamically varying window of predetermined length when the read data is real-time data.

61. The system of claim 60, wherein the reading module repeats the reading of the sample of the received data using a dynamically varying window of predetermined window length when the received data is real-time data.

62. The system of claim 51, wherein the analyzer specifies the learning parameters for the neural network using the learning parameters selected from the group consisting of number of input nodes, number of hidden layers, number of nodes in each of the layers, number of nodes at the output layer, learning rate, and dynamic storage for updating the initialized weights.

63. The system of claim 51, wherein the analyzer initializes weights using random values approximately in the range of about −0.5 to 0.5.

64. The system of claim 51, wherein the analyzer computes the normalized system error by using desired values and the predicted values, and the comparator compares the computed normalized system error with the normalized system error threshold value to reduce the error in the weight space using a gradient descent technique based on the outcome of the comparison.

65. The system of claim 64, wherein the gradient descent technique uses the equation:

$$W_{ij}(n+1) = W_{ji}(n) + \eta(\delta_j o_i)$$

Wherein $W_{ij}$ are the weights in a space of i rows and j columns, $o_j$ is the actual output, $\delta_j$ is the desired output, and $\eta$ is the learning rate.

66. The system of claim 65, wherein the analyzer enhances the learning rate of the neural network during updating of weights using a Hessian Matrix:

$$H[i, k] = \sum_k \sum_j G[k] * w[i, j]$$

wherein H[i, k] are diagonal elements of second order derivatives, wherein i,j, and k are an architecture dependent number of nodes and hidden layers, and wherein $$G[k] = \sum_j w[j, k] * d[i, k]$$

wherein G[k] is a gradient of the previous iteration error with respect to the weight space and i,j, and k are an architecture dependent number of nodes and hidden layers.

67. The system of claim 66, wherein the analyzer further enhances the learning rate of the neural network using a function approximation neighborhood technique to update weights using the equation:

$$W(t+1) = f(n, m, \delta r(t))$$

wherein n is a number of nodes in the input layer, m is a number of nodes in the next layer, and $\delta r(t)$ is a parameter based on a function of time.

68. The system of claim 67, further comprising:

repeating the varying learning rate, performing, and comparing to reduce the normalized system error.

69. The system of claim 51, wherein the analyzer validates the neural network to verify reliability of the learnt neural network by performing a supervised learning using learnt neural network to predict values, wherein the analyzer computes the accuracy of the predicted values by comparing the predicted values with known values, wherein the comparator compares the computed accuracy with an accuracy value, and the analyzer repeats the supervised learning based on the outcome of the comparison by the comparator.

70. The system of claim 69, further comprising:

repeating the varying learning rate of the neural network using techniques selected from the group consisting of Hessian matrix and function approximation neighborhood.

71. The system of claim 70, further comprising:

repeating the performing and validating of the neural network to enhance reliability of the learnt neural network.

72. The system of claim 71, further comprising:

an output module coupled to the analyzer to use the validated neural network to predict values.

* * * * *